United States Patent
De Bree

(10) Patent No.: US 8,561,713 B2
(45) Date of Patent: Oct. 22, 2013

(54) SOIL AERATION DEVICE

(75) Inventor: Cornelis Hermanus Maria De Bree, Zeist (NL)

(73) Assignee: Redexim Handel-En Exploitatie Maatschappij B.V., Ac Zeist (NL)

( * ) Notice: Subject to any disclaimer, the term of this patent is extended or adjusted under 35 U.S.C. 154(b) by 252 days.

(21) Appl. No.: 12/935,657

(22) PCT Filed: Mar. 24, 2009

(86) PCT No.: PCT/EP2009/053464
§ 371 (c)(1),
(2), (4) Date: Sep. 30, 2010

(87) PCT Pub. No.: WO2009/121758
PCT Pub. Date: Oct. 8, 2009

(65) Prior Publication Data
US 2011/0024140 A1 Feb. 3, 2011

(30) Foreign Application Priority Data
Apr. 1, 2008 (EP) .................................. 08153920

(51) Int. Cl.
*A01B 45/00* (2006.01)
(52) U.S. Cl.
USPC ........................................... 172/21; 172/125
(58) Field of Classification Search
USPC ............................................. 172/21, 22, 125
See application file for complete search history.

(56) References Cited

U.S. PATENT DOCUMENTS

| | | | | |
|---|---|---|---|---|
| 2,229,497 A * | 1/1941 | Dontje | ............................. | 172/21 |
| 4,153,115 A * | 5/1979 | van der Lely | ................ | 172/49.5 |
| 4,753,298 A | 6/1988 | Hansen | | |
| 4,926,947 A * | 5/1990 | Cozine et al. | .................... | 172/22 |
| 5,398,767 A * | 3/1995 | Warke | .............................. | 172/21 |
| 5,469,922 A | 11/1995 | Bjorge | | |
| 6,708,773 B1 * | 3/2004 | Kinkead et al. | .................. | 172/21 |
| 7,055,617 B2 * | 6/2006 | Bjorge et al. | .................... | 172/22 |
| 7,163,067 B2 * | 1/2007 | Job | ................................... | 172/21 |
| 8,162,071 B2 * | 4/2012 | Barger | ............................ | 172/21 |
| 2002/0189825 A1 | 12/2002 | Livingstone | | |
| 2003/0230417 A1 | 12/2003 | Maas | | |
| 2005/0194162 A1* | 9/2005 | Job | ............................... | 172/810 |
| 2011/0005783 A1* | 1/2011 | Livingstone | ...................... | 172/1 |

FOREIGN PATENT DOCUMENTS

EP 0037595 A1 10/1981

OTHER PUBLICATIONS

International Search Report dated Jul. 23, 2009 in corresponding International Patent Application No. PCT/EP2009/053464, 3 pages.

* cited by examiner

*Primary Examiner* — Jamie L McGowan
(74) *Attorney, Agent, or Firm* — Maier & Maier, PLLC

(57) ABSTRACT

A movable soil aeration device with a machine frame, a main input shaft for connection to a drive, an output shaft, preferably a crankshaft, coupled to the main input shaft via a reduction gearing, in which the output shaft can move at least one piercing tool up and down, The piercing tool can be pushed into the soil and be pulled therefrom. Different transmission ratios can be set at the reduction gearing.

12 Claims, 7 Drawing Sheets

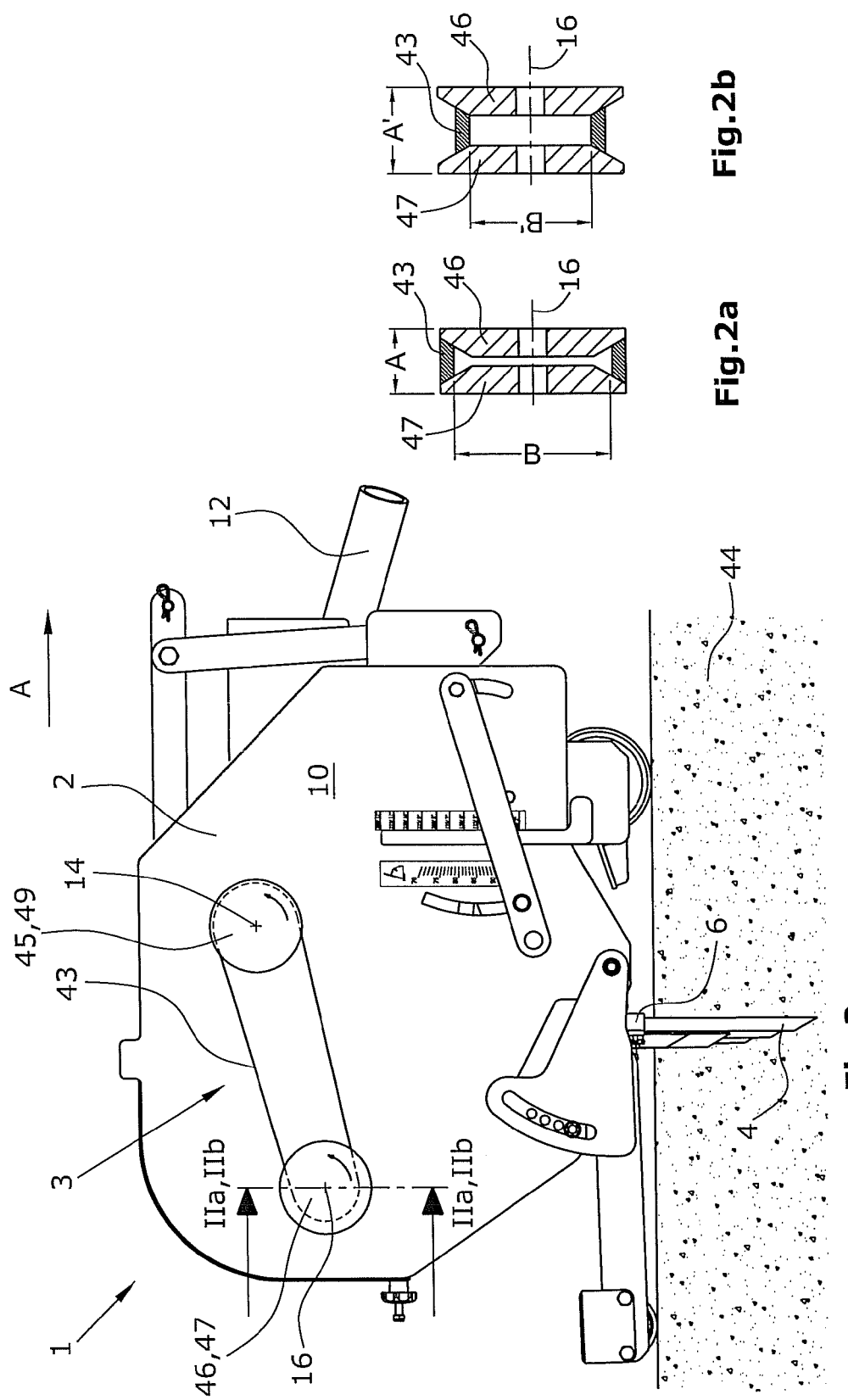

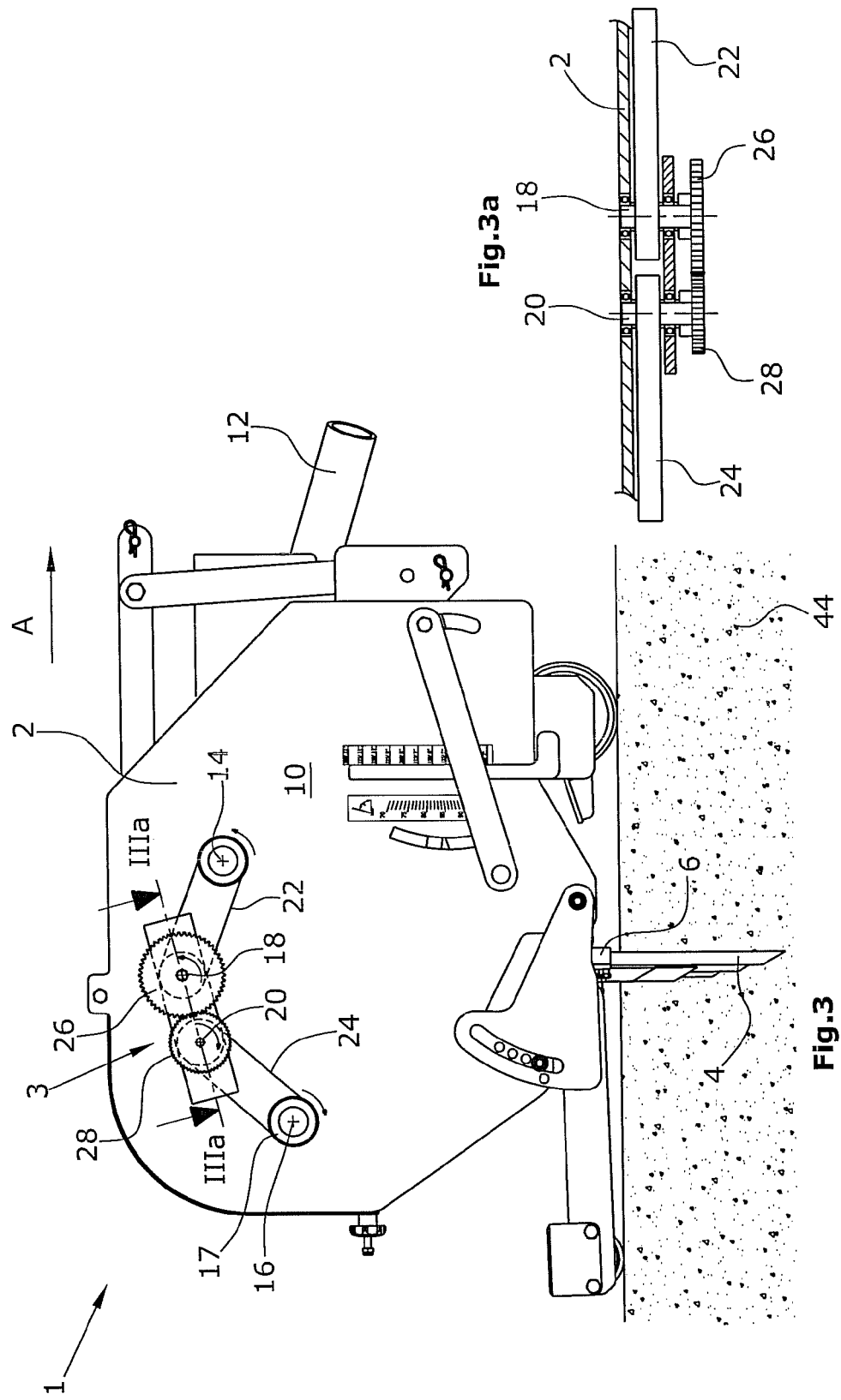

SOIL AERATION DEVICE

RELATED APPLICATIONS

Figure 1:
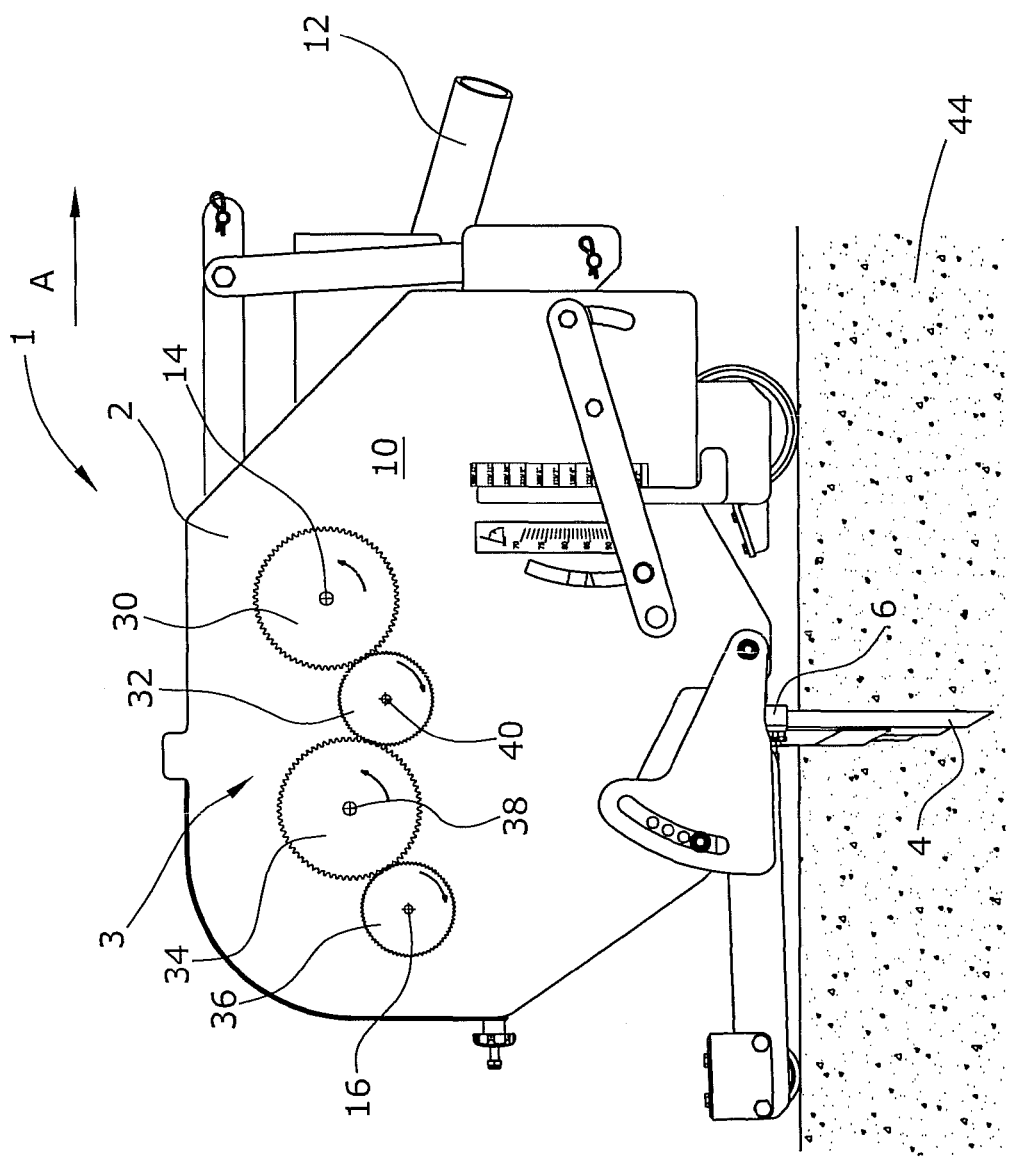

This application is the U.S. national stage application which claims priority benefit under 35 U.S.C. §371 to International Patent Application No.: PCT/EP2009/053464, filed on Mar. 24, 2009, which claims priority benefit under 35 U.S.C. §119, to European Patent Application No.: 08153920.7, filed on Apr. 1, 2008, the disclosures of which are incorporated by reference herein their entireties.

The invention refers to a mobile soil aeration device according to the preamble of claim 1.

Such devices serve to make cavities in a soil by means of piercing tools, wherein slit-shaped cavities are formed in the deeper regions of the soil, while holes as small as possible shall remain at the soil surface even at higher traveling speeds. The cavities allow for a better drainage of water and improve the soil aeration, while the loosening of the soil enhances the growth of plants, in particular of grasses.

The soil aeration devices used for these purposes up to the present and known from the European Laid-Open Document EP-A-0037595 use two support arms guided in the manner of a parallelogram, one end of which holds a tool holder for pivotable movement, while the other end is pivotably supported at the machine frame. The pushrod of the crank drive is articulated at the tool holder and drives the same so that it moves up and down. One of the two support arms is variable in length and comprises a stop spring means. As long as the piercing tool is outside the soil, the support arm rests against the stop due to the spring force. When the piercing tool is inserted and the soil aeration device moves forward, the piercing tool pivots together with the tool holder in a direction opposite to the traveling direction and the length-variable support arm is extended against the action of the spring force.

Presently known soil aeration devices, however, have the drawback that the hole distances of the holes made in the soil by the piercing tools are always the same. Depending on the ground, i.e. whether it is a green of a golf course or a soccer field, for instance, different hole distances are desired. It is also known to arrange a transfer gearbox between the two halves of the crankshaft. A transfer gearbox between the two halves of the crankshaft requires a lot of space. Further, the holes made in the soil are supposed to have the same distance from each other in the width direction of the machine. To achieve this, the pushrods, especially the pushrods situated beside the transfer gear box, are bent in the transversal direction so that this axial offset allows for a regular distance between the support arms of the piercing tools. However, bent pushrods are disadvantageous for the bearings since they have to absorb transversal forces.

It is therefore an object of the invention to develop a soil aeration device such that the above mentioned disadvantages are avoided and that the hole distances of the holes the soil aeration device makes in the soil in the traveling direction by means of the piercing tools can be changed in a simple and economic manner.

The object is achieved with the features of claim 1.

The invention advantageously provides that a soil aeration device of the above described type comprises a reduction gearing, it being possible to set different transmission ratios at the reduction gearing.

This has the advantage that the distances, seen in the traveling direction, between the holes made in the soil by the piercing tools can be adapted to different grounds or drainage and aeration requirements.

The reduction gearing may comprise an input shaft extending in parallel to an output shaft, the input shaft being coupled to the main input shaft.

The reduction gearing can be arranged at the outer side of a machine frame wall supporting the end of the crankshaft. This is advantageous in that the parts of the reduction gearing are easily accessible and can thus be replaced in a simple manner.

Preferably, the reduction gearing is situated between the input and the output shafts.

The reduction gearing may be a CVT gearing. This is advantageous in that the transmission ratio can be changed continuously. Moreover, the belt can slip at overload so that machine parts will not be damaged quickly.

The reduction gearing can be a pinion gearing with replaceable pairs of pinions.

Between adjacent pinions, the different pairs of pinions preferably have the same axial distance. Thus, the pairs of pinions can be replaced in a simple manner.

The reduction gearing can comprise at least two replaceable pairs of pinions, with the pinions preferably being arranged in one plane.

The pinion axes of all pinions of a reduction gearing may have the same distance from each other.

The reduction gearing may also be formed by an indexing gearing, for instance a planetary gear train.

On both outer walls, the input shaft can be coupled with a respective reduction gearing and the reduction gearings may comprise a common output shaft.

The reduction gearing can comprise a slip clutch, preferably an integrated slip clutch.

As an alternative, a transmission gearing or a gearing with a transmission ration of 1 could be used instead of the reduction gearing.

A transfer gearbox can be arranged between the main input shaft and the at least one input shaft. The transfer gearbox may be arranged in front of the output shaft, seen in the traveling direction. As an alternative, the transfer gearbox may be arranged behind the output shaft, seen in the traveling direction.

The transfer gearbox may be adapted to be combined with an indexing gearing.

Embodiments of the invention will be detailed hereunder with reference to the drawings.

Figure 4A:
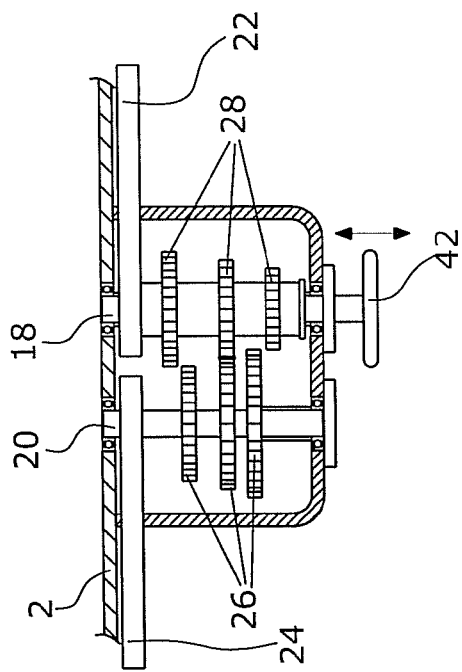
Figure 4:
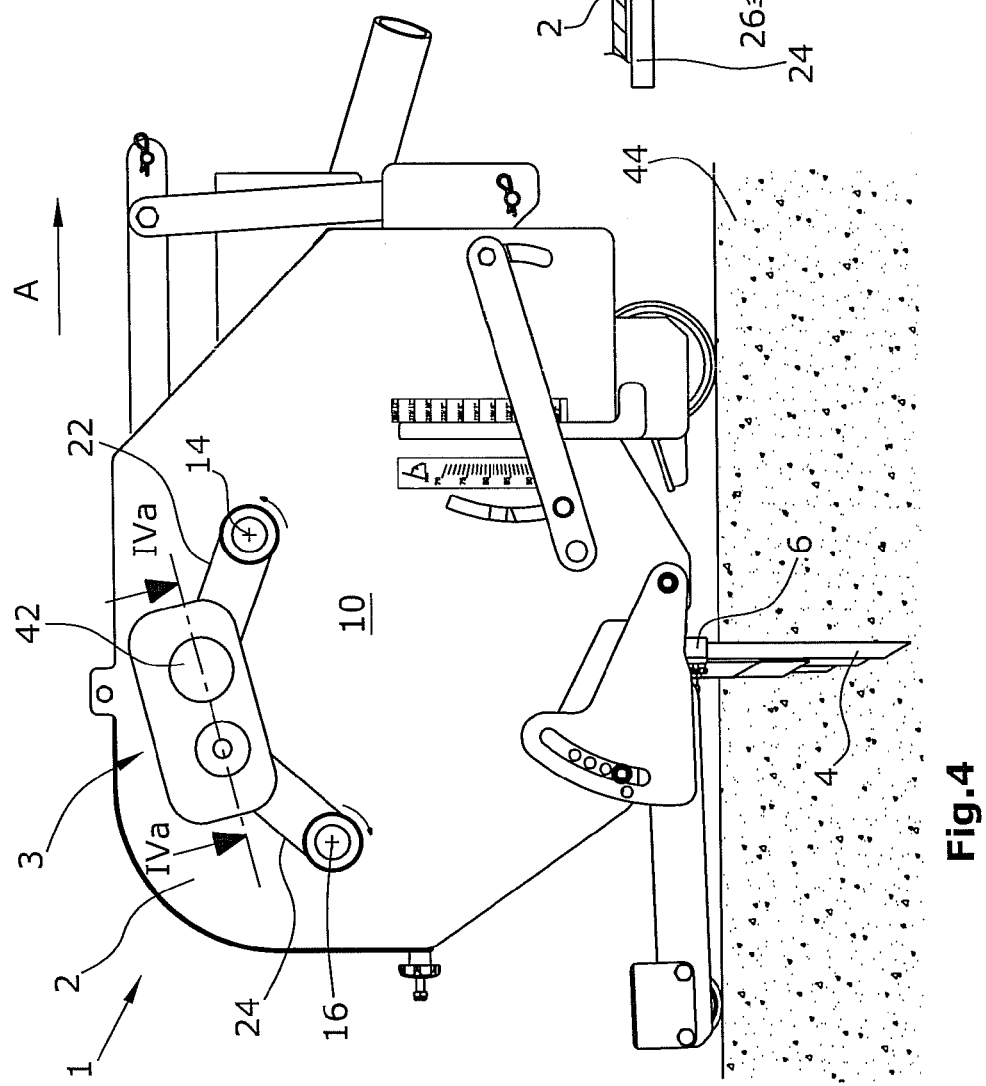
Figure 5:
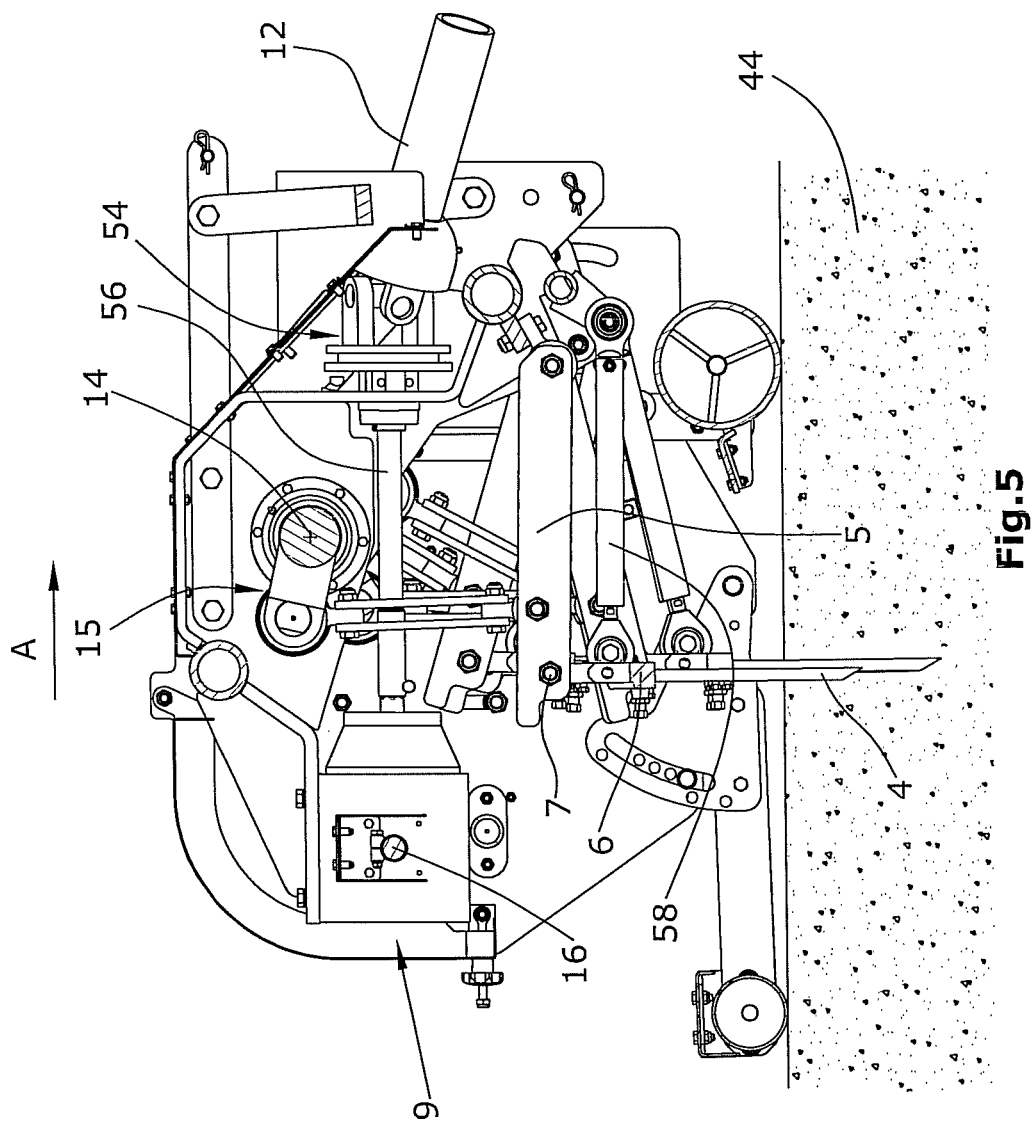
Figure 6:
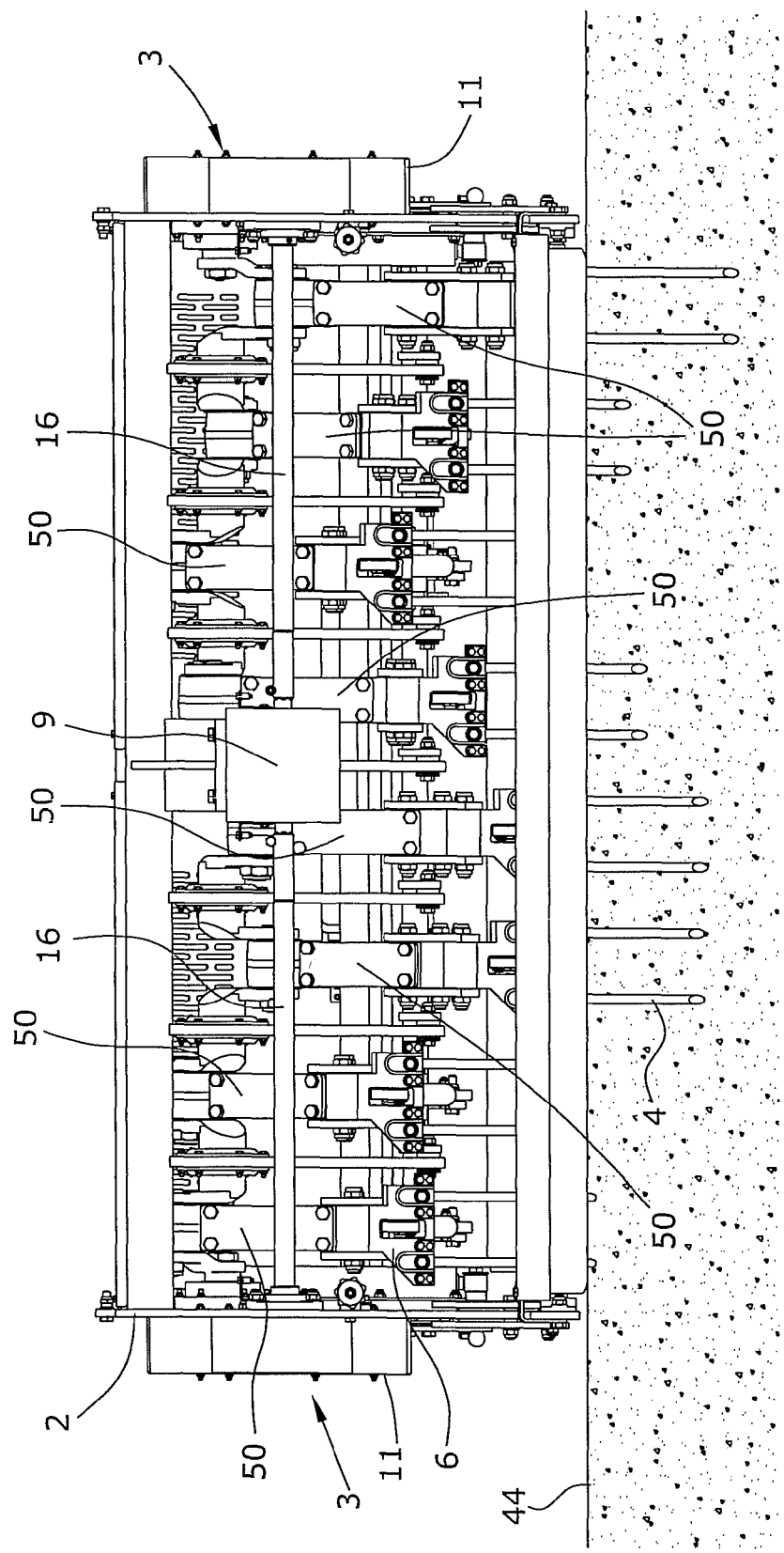
Figure 7:
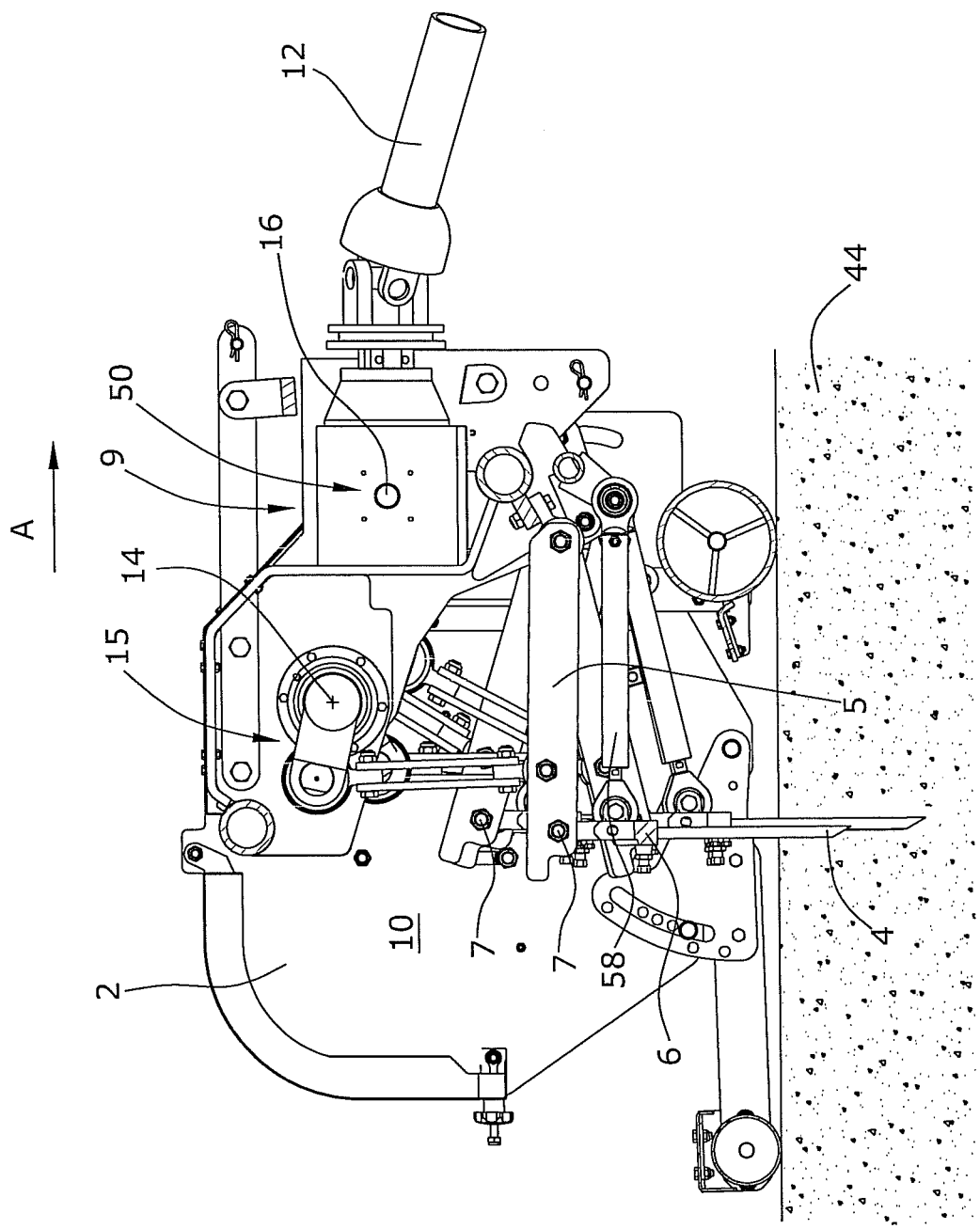

The Figures schematically show:

FIG. 1 a soil aeration device with a spur gearing at the machine frame,

FIG. 2 a soil aeration device with a CVT transmission,

FIG. 3 a soil aeration device comprising both a spur gearing and a belt transmission, FIG. 3*a* a detail of the embodiment in FIG. 3, FIG. 4 a soil aeration device with a shiftable spur gearing, FIG. 4*a* a detail of the embodiment in FIG. 4, FIG. 5 a sectional side view of an embodiment comprising a transfer gearbox situated behind the output shaft, seen in the traveling direction, FIG. 6 a rear view of the embodiment in FIG. 5, FIG. 7 a sectional side view of an embodiment comprising a transfer gearbox in front of the output shaft, seen in the direction of travel.

FIG. 1 illustrates a soil aeration device which may be pulled by a tractor. The soil aeration device comprises a machine frame 2, in which a plurality of piercing tools 4 is pivotably supported for upward and downward movement. A plurality of piercing tools or sets of piercing tools are arranged side by side in a direction transverse to the raveling direction A. The piercing tools 4 are alternately pushed into the soil 44 and are adapted to perform a pivot movement due to the advance movement of the soil aeration device 1, whereby the soil 44 beneath the pierced hole is broken in a slot-like manner in parallel to the traveling direction, so that, for example, the aeration and the drainage of the soil 44 are enhanced.

The piercing tools 4 are mounted to a respective tool holder 6 either as single tools or as sets of tools. The tool holders 6 are each supported at a support arm 5, acting as a guide element, such that they are pivotable about a pivot axis 7. The support arms 5 are moved up and down by means of a drive, preferably a crank drive 15. The up-and-down movement of the support arms 5 also moves the tool holders 6 with the piercing tools 4 up and down, the piercing tools 4 being adapted to be pushed into the soil 44 and to be pulled therefrom. Disposed in parallel to the support arm 5 is a length-variable restoring arm 58 that is pivotably supported, on the one hand, at the tool holder 6 and, on the other hand, at the machine frame 2. Outside the soil 44, the restoring arm 58 exerts a restoring force on the tool holder 6, for example through a restoring spring arranged in the restoring arm 58, so that the tool holder and thereby the piercing tools 4 pivot back to the start position when outside the soil. For details of the structure of the tool holder guided in the manner of a parallelogram reference is made to the European Laid-Open Document EP-A-0037595.

The drive is preferably formed by a crank drive 15. The drive comprises an output shaft 14. With a crank drive 15, the output shaft 14 is a crankshaft. The output shaft 14 is arranged transversally to the traveling direction and in parallel to the soil 44, and is supported at least on both sides of the soil aeration device, preferably at a plurality of places, at the machine frame 2. A reduction gearing 3 couples the output shaft 14 to a main input shaft 12 that extends substantially in parallel to the traveling direction. The main input shaft 12 is driven by the drive of the tractor. As an alternative, the main input shaft 12 of a self-propelled soil aeration device 1 can also be driven by the motor of the soil aeration device 1.

The reduction gearing 3 further comprises an input shaft 16. The input shaft 16 extends in parallel to the output shaft 14. The input shaft 16 is also supported at the machine frame 2 on both sides of the soil aeration device. On at least one side, the ends of the output and the input shafts 14, 16 protrude laterally outward beyond the side walls 10 of the machine frame 2. The free end of the input shaft 16 protruding outward from the machine frame 2 is provided with a pinion 36 which is connected to the shaft for rotation therewith. The input shaft 16 drives a pinion 30 via the pinion 36 and two further pinions 34, 32, the former pinion being connected to the output shaft 14 for rotation therewith.

The pinion 30 of the output shaft 14 is arranged on the free end of the output shaft 14 projecting outward from the machine frame 2. The two pinions 32, 34 are connected for rotation with a respective axle stub 38, 40 which is each supported in the side wall of the machine frame 2. The two pinions 32, 34 are also arranged on the outer side of the side wall 10 of the machine frame 2. The reduction gearing 3 comprising the pinions 30, 32, 34, 36 is enclosed by a removable housing or cover to avoid the risk of accidents during operation and to avoid a soiling of the reduction gearing.

It is an advantage of this embodiment that the pinions 30, 32, 34, 36 can readily be removed since the pinions 30, 32, 34, 36 are situated on the outer side of the machine frame 2. The pinions 30, 32, 34, 36 can be replaced with other pinions having other numbers of teeth and thus other diameters. Thereby, the transmission ratio of the reduction gearing, and thus the distance between the holes in the soil made in the traveling direction, can be changed. Further, this allows for a change of the angular velocity of the crankshaft by which the piercing tools 4 are pushed into the soil and are pulled therefrom.

The respective replaceable pinion pairs preferably have the same axial distance from each other than the pinions 30, 32 and 34, 36. In this manner, no additional axle stubs have to be supported in the machine frame 2 when the pinions 30, 32, 34, 36 have to be replaced. It is also possible to change the transmission ratio by using the same pinion pairing and by merely interchanging the position of the smaller and larger pinions such that the larger pinions take the position of the smaller pinions and vice versa.

FIG. 2 illustrates a soil aeration device similar to the one in FIG. 1, differing in that the reduction gearing 3 used is a CVT transmission. A CVT transmission is characterized in that the transmission ratio between the input shaft and the output shaft 14, 16 can be set continuously. In the embodiment of FIG. 2, this is achieved by providing a pair of cone pulleys 46, 47 at the end of the input shaft 16 protruding outward beyond the machine frame 2. The pair of cone pulleys 46, 47 is connected to the input shaft 16 for rotation therewith. A belt 43 runs between the respective cone pulleys 46, 47. The belt 43 drives a second pair of cone pulleys 45, 49 that is connected to the output shaft 14 for rotation therewith. The two cone pulleys 46, 47 can be pulled apart in the direction of the input shaft 16 such that the diameter of the cone pulleys 46, 47 effective for the belt 43 is reduced, e.g., from B to B'. At the same time, the two cone pulleys 45, 49 are compressed so that the effective diameter of the cone pulleys 45, 49 is enlarged. Changing the effective diameter of the cone pulleys 46, 47 and 45, 49 also changes the circulation velocity of the belt 43. The transmission ratio of the reduction gearing 3 is changed in this manner.

FIG. 3 illustrates a soil aeration device that is similar to the embodiments in FIGS. 1 and 2. The soil aeration device in FIG. 3 differs in that the reduction gearing 3 is a combination of a belt drive and a spur gearing. A pulley 17 is provided for rotation with the input shaft at the end of the input shaft 16 protruding outward from the machine frame 2. The pulley 17 drives the pinion 28 via a belt 24. The pinion 28 in turn drives the pinion 26. The two pinions 26, 28 are each supported on an axle stub 18, 20 for rotation therewith, the respective stubs being supported in the machine frame. The pinion 26 drives an output shaft 14 via a belt 22. It is a disadvantage of this embodiment that the belts can slip at overload. Alternatively, a chain drive with sprockets could be provided. In this embodiment, however, a slip clutch is needed in addition as an overload protection means.

The two pinions 26, 28 can be replaced with other pinions having different numbers of teeth and thus different diameters. The other pinions should have the same axial distance from each other as the two pinions 26, 28, so that it is not necessary to also replace the belts 22, 24 when the pinions are replaced, and to provide additional axle stubs. The lengths of the belts 22, 24 can thus remain constant. Replacing the pinions 26, 28 with pinions having another number of teeth allows or a change of the transmission ratio of the reduction gear 3. Given that the replaceable pinion pairs have the same module m, the pinion pairs have the same axial distance from each other, if the pinion pairs each have the same total number of teeth, so that the same axle stubs supported in the side wall 2 can be used. When changing the positions only one pinion pair is needed, if the two pinions forming the pinion pair do not have the same number of teeth and thus do not have the same axial distance.

FIG. 4 illustrates an embodiment which is very similar to the one in FIG. 3. It differs in hat a plurality of pinion pairs 26, 28 are provided instead of the pinions 26, 28. These pinion pairs each have the same axial distance from each other. The pinions 28 are all connected to the axle stub 20 for rotation therewith and are driven by the input shaft 16 via the belt 24. All of the pinions 26 are connected to the axle stub 18 for rotation therewith and drive the output shaft 14 via the belt 22. The axle stubs 18, 20 are supported in the machine frame 2. On the axle stub 18, the pinions 26 are arranged at other mutual distances than the pinions 28 on the axle stub 20. This makes it possible that different pinion pairs can come to mesh. The fact that the shift lever 42 shifts the pinions 26 axially on the axle stub 18, makes it possible to make different pinion pairs 26, 28 mesh. With this indexing gearing, the transmission ratio can be changed quickly without any assembly work. As an alternative, it would be possible also in this embodiment to provide a chain drive with sprockets, which again would call for a slip coupling.

The output shaft 14 can protrude outward from the machine frame 2 on both sides of the soil aeration device 1. In the embodiments of FIGS. 1 to 4, one reduction gearing 3 can be arranged respectively at the two ends of the output shaft 14 protruding beyond the machine frame 2. The output shaft 14, which preferably is a crankshaft, may also be split in the longitudinal direction, preferably in the middle.

FIG. 5 illustrates a sectional side view of one of the embodiments in FIGS. 1-4. The input shaft 16 is situated behind the output shaft 14, seen in the traveling direction, which in the present case is a crankshaft. A transfer gearbox 9 is arranged between the main input shaft 12 and the input shaft 16. The main input shaft 12 is coupled to the transfer gearbox 9 via a universal joint 54 and an intermediate shaft 56. The transfer gearbox 9 is preferably positioned centrally with respect to the width of the soil aeration device 1. The transfer gearbox 9 is also situated behind the output shaft 14, seen in the traveling direction A, this has the advantage that the transfer gearbox 9 is not positioned between the two crankshaft halves and that the pushrods 50 therefore extend rectilinearly as illustrated in FIG. 6.

FIG. 6 is a rear view of the soil aeration device 1 in FIG. 5 with the rear protective cover removed. It is obvious that the pushrods 50 are straight whereby the bearings are stressed symmetrically since no or rather small transverse forces act on the bearings. One reduction gearing 3 is provided respectively at the outer sides of the two outer walls of the machine frame 2, the reduction gearings 3 being enclosed by a respective protective housing 11. The reduction gearings 3 may be formed by a reduction gearing 3 illustrated in FIGS. 1-4. As an alternative, an indexing gearing could be combined with the transfer gearbox 9.

The embodiment in FIG. 5 and FIG. 6, respectively, is advantageous in that due to the fact that the transfer gearbox 9 is arranged behind the output shaft 14, seen in the traveling direction, the distance between the drawn soil aeration device 1 and the tractor is reduced. This has the advantage that the entire soil aeration device 1 can be lifted more easily by the tractor, when out of operation.

FIG. 7 illustrates a soil aeration device with a transfer gearbox 9 hingedly coupled to the end of the main input shaft 12. The transfer gearbox 9 is arranged preferably at the center of the width of the soil aeration device 1. Seen in the traveling direction, the transfer gear box 9 is arranged in front of the output shaft 14 which preferably is a crankshaft. The transfer gearbox 9 is positioned between the main input shaft 12 and the input shafts 16. The main input shaft 12 is the input shaft of the transfer gearbox 9. The output shafts of the transfer gear box 9 form the input shafts 16. The input shafts 16 extend transversely to the traveling direction A and in parallel to the ground 44. Like in the embodiment of FIG. 5 and FIG. 6, both outer sides of the side walls of the machine frame 2 can be provided with a respective reduction gearing 3 which is variable in its transmission ratio and couples the input shafts 16 with the output shaft 14.

As an alternative, the transfer gearbox 9 can be combined with an indexing gearing. The indexing gearing could be a planetary gear train or another shiftable pinion gearing, for instance. The combination of the transfer gearbox 9 and an indexing gearing could preferably be coupled on the input side immediately with a slip clutch. Like the transfer gearbox 9 by itself, the combination of the transfer gearbox 9 and an indexing gearing is arranged preferably in the center of the width of the soil aeration device 1. The indexing gearing could be a planetary gear train or another shiftable pinion gearing, for instance. The combination of the transfer gearbox 9 and an indexing gearing could preferably be coupled on the input side immediately with a slip clutch. With a combination of a transfer gearbox 9 and an indexing gearing, the input shafts 16 and the output shaft 14 could for instance be driven by gearings without variable transmission ratios comprising belts or chains or pinions on the sides of the soil aeration device.

The embodiment of FIG. 7 also has the advantage that the transfer gearbox 9 is not arranged between crankshaft halves. Thus, the pushrods 50 can also be of a straight design.

The invention claimed is:

1. Movable soil aeration device comprising:
   a machine frame,
   a main input shaft for connection to a drive,
   an output shaft, which is a crankshaft, coupled to the main input shaft via a reduction gearing, which output shaft is adapted to move at least one piercing tool up and down, said piercing tool being adapted to be pushed into the soil and to be pulled therefrom,
   wherein
   different transmission ratios can be set at the reduction gearing,
   wherein the reduction gearing is arranged on an outer side of at least one outer wall of the machine frame,
   wherein the reduction gearing further comprises an input shaft extending in parallel to the output shaft, said input shaft coupled to the main input shaft, wherein a transfer gearbox is arranged between the main input shaft and the at least one input shaft, wherein the transfer gearbox is arranged behind the output shaft, seen in the traveling direction.

2. Soil aeration device of claim 1, wherein said reduction gearing is arranged on an outer side of a wall of the machine frame supporting the end of a crankshaft.

3. Soil aeration device of claim 1, wherein said reduction gearing is arranged between the input and output shafts, 4. Soil aeration device of claim 1, wherein the reduction gearing is a CVT transmission.

5. Soil aeration device of claim 1, wherein the reduction gearing is a pinion gearing with replaceable pinion pairs.

6. Soil aeration device of claim 5, wherein the different pinion pairs of adjacent pinions have the same axial distance.

7. Soil aeration device of claim 5, wherein the reduction gearing further comprises at least two replaceable pinion pairs, 8. Soil aeration device of claim 1, wherein the reduction gearing is a combination of a non-positive or a positive traction gearing and a pinion gearing.

9. Soil aeration device of claim 1, wherein the input shaft is coupled to at least two outer walls with a respective reduction gearing and that the reduction gearings comprise a common output shaft.

10. Soil aeration device of claim 1, wherein the reduction gearing is an indexing gearing, 11. Soil aeration device of claim 10, wherein the main input shaft and the output shaft are coupled through said indexing gearing.

12. Soil aeration device of claim 1, wherein the reduction gearing further comprises a slip coupling.

\* \* \* \* \*